United States Patent [19]
Katashiba et al.

[11] Patent Number: 5,675,968
[45] Date of Patent: Oct. 14, 1997

[54] SECONDARY AIR CONTROL APPARATUS FOR EXHAUST GAS PURIFIER

[75] Inventors: Hideaki Katashiba; Ryoji Nishiyama; Yasuhiko Hosoya; Toshiki Kuroda, all of Hyogo, Japan

[73] Assignee: Mitsubishi Denki Kabushiki Kaisha, Tokyo, Japan

[21] Appl. No.: 576,395

[22] Filed: Dec. 21, 1995

Related U.S. Application Data

[63] Continuation of Ser. No. 86,325, Jul. 6, 1993, abandoned.

[30] Foreign Application Priority Data

Aug. 25, 1992 [JP] Japan .................. 4-247165

[51] Int. Cl.$^6$ .................................................. F01N 3/22
[52] U.S. Cl. ..................... 60/276; 60/284; 60/289; 60/290; 60/301
[58] Field of Search ............... 60/276, 284, 290, 60/289, 301

[56] References Cited

U.S. PATENT DOCUMENTS

| | | | |
|---|---|---|---|
| 3,503,716 | 3/1970 | Berger | 60/284 |
| 3,696,618 | 10/1972 | Boyd | 60/289 |
| 3,733,829 | 5/1973 | Henault | 60/289 |
| 3,793,830 | 2/1974 | August | 60/301 |
| 3,943,709 | 3/1976 | Holt | 60/284 |
| 3,945,802 | 3/1976 | Eckert . | |
| 3,962,867 | 6/1976 | Ikeura | 60/290 |
| 4,098,078 | 7/1978 | Laurent | 60/290 |
| 4,199,938 | 4/1980 | Nakase et al. . | |
| 4,240,254 | 12/1980 | Nakase et al. . | |
| 4,404,805 | 9/1983 | Curtil . | |
| 5,285,639 | 2/1994 | Araki | 60/289 |

FOREIGN PATENT DOCUMENTS

| | | |
|---|---|---|
| 3023429 | 1/1981 | Denmark . |
| 3919343 | 12/1990 | Denmark . |
| 0412521 | 2/1991 | European Pat. Off. . |
| 0497034 | 8/1992 | European Pat. Off. . |
| 36 34 015 A1 | 4/1987 | Germany . |
| 36 34 472 A1 | 5/1987 | Germany . |
| 40 41 628 A1 | 2/1992 | Germany . |
| 41 27 596 A1 | 3/1992 | Germany . |
| 44 26 788 A1 | 2/1995 | Germany . |
| 63-18122 | 1/1988 | Japan . |

*Primary Examiner*—Douglas Hart
*Attorney, Agent, or Firm*—Sughrue, Mion, Zinn, Macpeak & Seas, PLLC

[57] ABSTRACT

A secondary air control apparatus constituted by an exhaust gas purifier 32 of an engine 21, a feed quantity control valve 29 for feeding secondary air, a secondary air heating device 31, and a controller 35 for controlling the feed quantity of secondary air and the secondary air heating device 31. The quantity of secondary air to be fed is set in accordance with the operation conditions of an engine, and the secondary air to be fed is modulated in quantity and heated, so that it is possible to utilize the purifying effect of a catalyst efficiently.

7 Claims, 12 Drawing Sheets

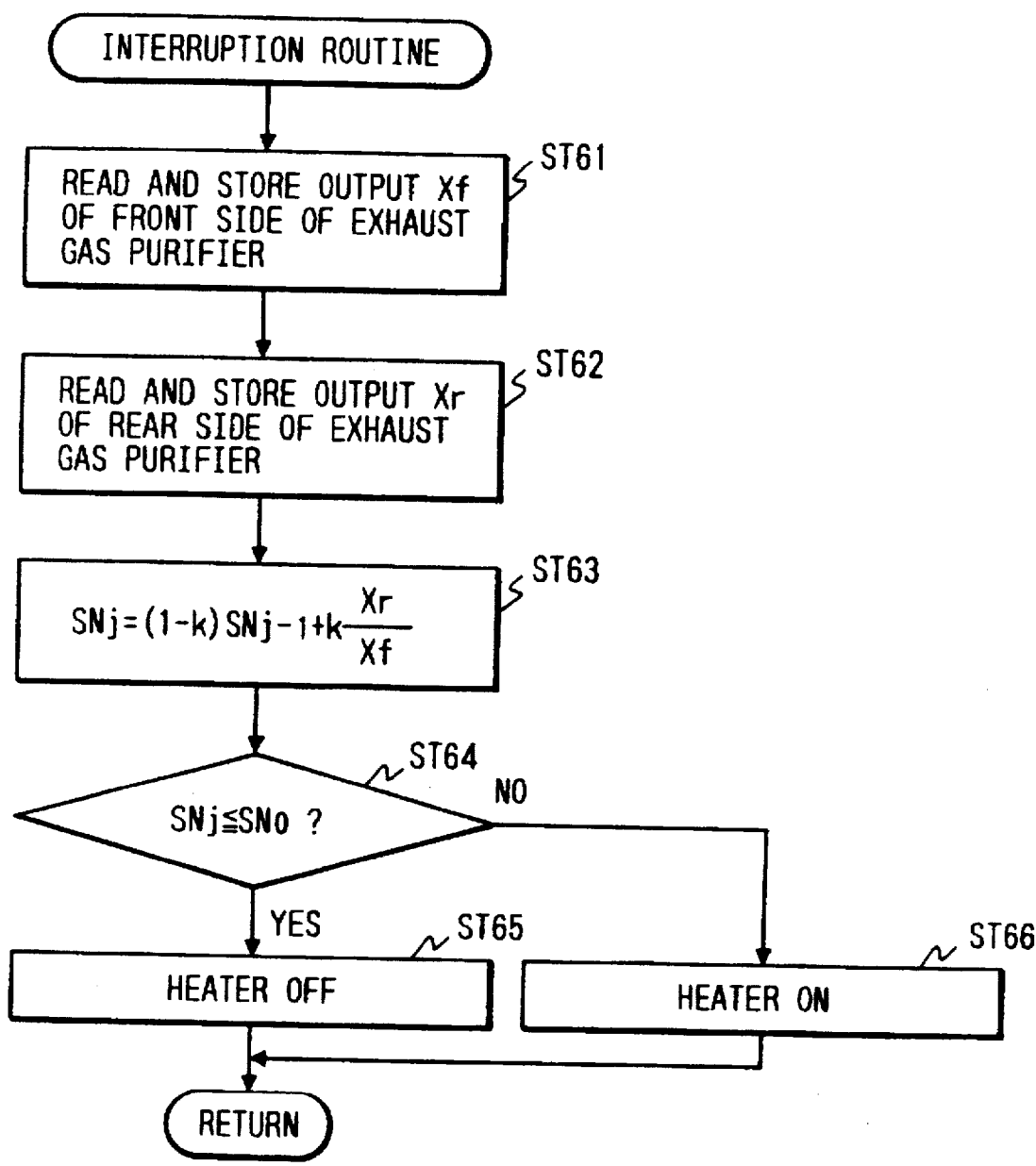

SECONDARY AIR CONTROL APPARATUS FOR EXHAUST GAS PURIFIER

This is a Continuation of application Ser. No. 08/086,325 filed Jul. 6, 1993 now abandoned.

BACKGROUND OF THE INVENTION

The present invention relates to a secondary air control apparatus for controlling secondary air which is fed to an exhaust gas purifier for purifying exhaust gas of an engine by using a catalyst device.

FIG. 13 is a configuration diagram illustrating a conventional secondary air control apparatus, for example, disclosed in Japanese Patent Unexamined Publication (Kokai) Sho-63-18122. In the drawing, the reference numeral 9 represents a cylinder of an engine; 8, a water temperature sensor provided in a cooling water passageway of the cylinder 9; 13, a suction pipe for feeding air to the cylinder 9; 15, a throttle valve for adjusting the quantity of air of the suction pipe 13; 16, an air flow sensor for detecting the quantity of air; 18, a fuel injection valve; 12, an air intake valve; 10, an exhaust valve; and 11, an ignition plug.

The reference numeral 14 represents an exhaust pipe; 6, a catalyst converter provided on the way of the exhaust pipe 14; 17, a catalyst temperature sensor for detecting the temperature of the catalyst converter 6; 5, a secondary air feed pipe for feeding secondary air to the exhaust pipe 14 on the entrance side of the catalyst converter 6; 7, an air pump for delivering purified air to the secondary air feed pipe 5; 3, a valve for controlling the feed quantity of the secondary air; 2, a solenoid for controlling the valve 3; and 4, a relief passageway of the valve 3. Further, the reference numeral 1 represents a control unit for controlling the throttle valve 15, the fuel injection valve 18, the solenoid 2, etc. on the basis of detection signals of the respective sensors 8, 17 and 16, a start signal of the engine, the rotational speed of the engine, and so on.

Next the operation will be described with reference to the flow chart in FIG. 14.

First, the operation conditions of the engine are read in Step ST141. The information about operation conditions includes, for example, the engine revolution speed rpm, the opening of the throttle TVO, and the quantity of suction air Qa. In Step ST142, on the basis of such information, the basic quantity of fuel injection $Te_2$ is calculated in accordance with the following expression.

$$Te_2 = k \cdot Qa/\text{rpm} \quad (k \text{ is a coefficient})$$

Next, the correction quantity of water temperature $C_T$ stored in a ROM in advance is set in Step ST143. The lower the temperature of water TEMP, the larger this character. This is because it is necessary to enrich the fuel-air mixture at the time of low temperature. Various correction quantities (Cz) are set in Step ST144. This is because it is necessary to enrich the fuel-air mixture in a constant operation condition such as at the time of low load, idling, or the like. In addition, in this Step ST144, control is made so that fuel after starting is corrected so as to be increased correspondingly to the temperature of engine water, this increase correction being reduced as the time proceeds.

In Step ST145, judgment is made as to whether TEMP is higher than a predetermined temperature (constant a) or not. If it is proved that TEMP is lower than the temperature a, judgment is made as to whether it is immediately after starting the engine or not in Step ST146. If it is immediately after starting the engine, a secondary air timer T is set to an initial value (X) in Step ST147. If the secondary air timer T has been set once, thereafter it means that it is not immediately after starting, so that the secondary timer T is counted down by a decrement Z in Step ST151. The lower the temperature of water, the shorter the value X set in the secondary air timer T.

In Step ST148, judgment is made as to whether the secondary air timer has been timed out or not. If it has been not timed out, judgment is made as to whether it belongs to a secondary air feed area or not from the signals TVO and rpm in Step ST149. Irrespective of what the result of the judgment is, the timer T is decreased in Step ST151 after the decrement y itself is calculated in Step ST150. This is because, indeed in the control shown in FIG. 14, overheating the catalyst converter 6 can be basically prevented by making the set time X of the secondary air timer T variable in accordance with TEMP, but in order to prevent overheating more accurately in areas including exhaust gas thickly, the above-mentioned time-out time is made variable in accordance with the quantity of exhaust gas in the decrease routine of Step ST150 and the following steps to thereby attain precise control.

That is, the decrement y is determined in consideration of the signals Qa and rpm in Step ST150. At this time, b and c are predetermined coefficients stored in the ROM. If Qaxrpm is large, the quantity of exhaust gas is also increased, so that the coefficients b and c are set in advance so as to reduce the time to supply secondary air (increase the decrement y) in such a case. The timer T is subtracted in Step ST151, and judgment is made as to whether the judgment in Step ST149 has shown a secondary air feed area (air injection area) or not in Step ST152. If it is a secondary air feed area, an ACVS flag in an RAM is made ON in Step ST153. If it is not a secondary air feed area, the ACVS flag is made OFF in Step ST154.

The reason why the decrement y is made to be a value corresponding to the quantity of suction air Qa and the engine speed rpm in Step ST150 irrespective whether it is a secondary air feed area or not, is that if it is before time out, there can be much unburned gas even if not a secondary air feed area, and it is necessary to prevent the temperature of the purifier from being increased thereby.

Next, in Step ST155, the final quantity of fuel injection INJ is calculated on the basis of $INJ = Te_2 \times C_T \times C_Z$, and in Step ST156, a driver is driven on the basis of the above-mentioned INJ and ACVS flag. If a control value is outputted in Step ST156 when this ACVS flag is ON, the solenoid 2 is accelerated through the driver.

The above-mentioned respective steps are repeated till the time out of the timer T is concluded in Step ST148. If the timer T has been timed out once, the solenoid 2 is left OFF till TEMP≧a is proved in Step ST145.

The case where TEMP≧a is proved in Step ST145 means the case where the engine has been already warmed prior to engine starting so that TEMP≧a is established before the timer T after engine starting is timed out, and the case where the engine is in the stationary temperature state in a normal engine driving area. In such a case, the engine is in a normal rotation, so that an unburned gas component is so small that heating of the catalyst converter 6 does not cause any serious trouble. Therefore, mainly only from the point of view of purifying exhaust gas, judgment is made as to whether it is a secondary air feed area or not on the basis of the signals TVO and rpm obtained in Step ST157 to thereby control secondary air, and the flag is made ON or OFF in Step ST159 or ST154 on the basis of the judgment (Step ST158).

Next, on the basis of the above result, the quantity of fuel injection INJ is calculated in Step ST155, and then outputted together with the quantity of solenoid control ACVS in Step ST156.

Since the conventional secondary air control apparatus has such a configuration as described above, if the exhaust gas purifier using the catalyst converter 6 is installed away from the engine, for example, under the floor, or the like, to prevent the exhaust gas purifier from being heated, the increasing of the temperature of the exhaust gas purifier is delayed late so that there has been a problem that it is impossible to purify the exhaust gas enough, and so on. In addition, since air is led in from the upstream of the catalyst in the secondary air control apparatus, the exhaust gas becomes oxide atmosphere so that there has been a problem that it is impossible to reduce nitric oxide (hereinafter referred to as 'NO$_x$') with the catalyst.

Particularly, in consideration of the fact that the quantity of exhaust harmful components (HC, CO, NO$_x$) in the exhaust gas at the time of low temperature of the engine becomes 10 times or more as large as that at the time of high temperature, it is important to bring the exhaust gas purifier into a condition of high temperature (about 400 degrees) in a short time (in about 30 seconds) after engine starting to thereby restrain the quantity of exhaust NO$_x$ due to leading-in of the secondary air.

SUMMARY OF THE INVENTION

The present invention has been made to solve the foregoing problems, and it is an object thereof to provide a secondary air control apparatus of an engine in which the temperature rising of an exhaust gas purifier is accelerated at the time of cool engine starting so that the quantity of purifying unburned components in the exhaust gas can be increased without increasing the quantity of exhaust NO$_x$.

The secondary air control apparatus, according to a first aspect of the present invention, comprises a control valve for controlling the feed quantity of secondary air, and the amplitude and frequency of a control signal for controlling the control valve is calculated on the basis of the quantity of suction air of the engine, the temperature of cooling water of the engine, and so on.

The secondary air control apparatus, according to a second aspect of the present invention, comprises a secondary air heating device for heating secondary air, and the secondary air heating device is controlled on the basis of the temperature of cooling water of the engine or the temperature of the exhaust gas purifier.

The secondary air control apparatus, according to a third aspect of the present invention, comprises two detection device provided respectively on the entrance and exit sides of an exhaust gas purifier and for detecting the density of oxygen, and an above-mentioned secondary air heating device is controlled on the basis of the ratio of outputs of the two detection devices.

The secondary air control apparatus, according to a fourth aspect of the present invention, comprises first and second exhaust gas purifying devices provided in series within the exhaust gas purifier, and secondary air is selectively fed to only the second exhaust gas purifying device or both the first and second exhaust gas purifying devices on the basis of operation conditions of the engine.

According to the invention, the calculation control device calculates the modulation amplitude and frequency of the control signal for controlling the feed quantity of secondary air so that the exhaust gas purifier can purify exhaust gas most effectively and accelerate the temperature rising.

The secondary air heating device heats the secondary air to prevent the performance of purifying of the exhaust gas purifier from lowering because of the temperature lowering of exhaust gas. If the engine is warmed up and it is proved that the exhaust gas purifier is performing a satisfactory operation, the operation of the secondary air heating device is stopped.

The first and second exhaust gas purifying devices are controlled so that secondary air is fed thereto corresponding to the operation conditions of the engine such as the rotational speed of the engine, the temperature of cooling water, and so on to thereby reduce the quantity of exhaust HC and CO.

BRIEF DESCRIPTION OF THE DRAWINGS

FIG. 6 is a flow chart illustrating the operation of an embodiment of the invention;

DETAILED DESCRIPTION OF PREFERRED EMBODIMENTS

Embodiment 1

A first embodiment of the invention stated will be described with reference to the drawings.

Figure 1:
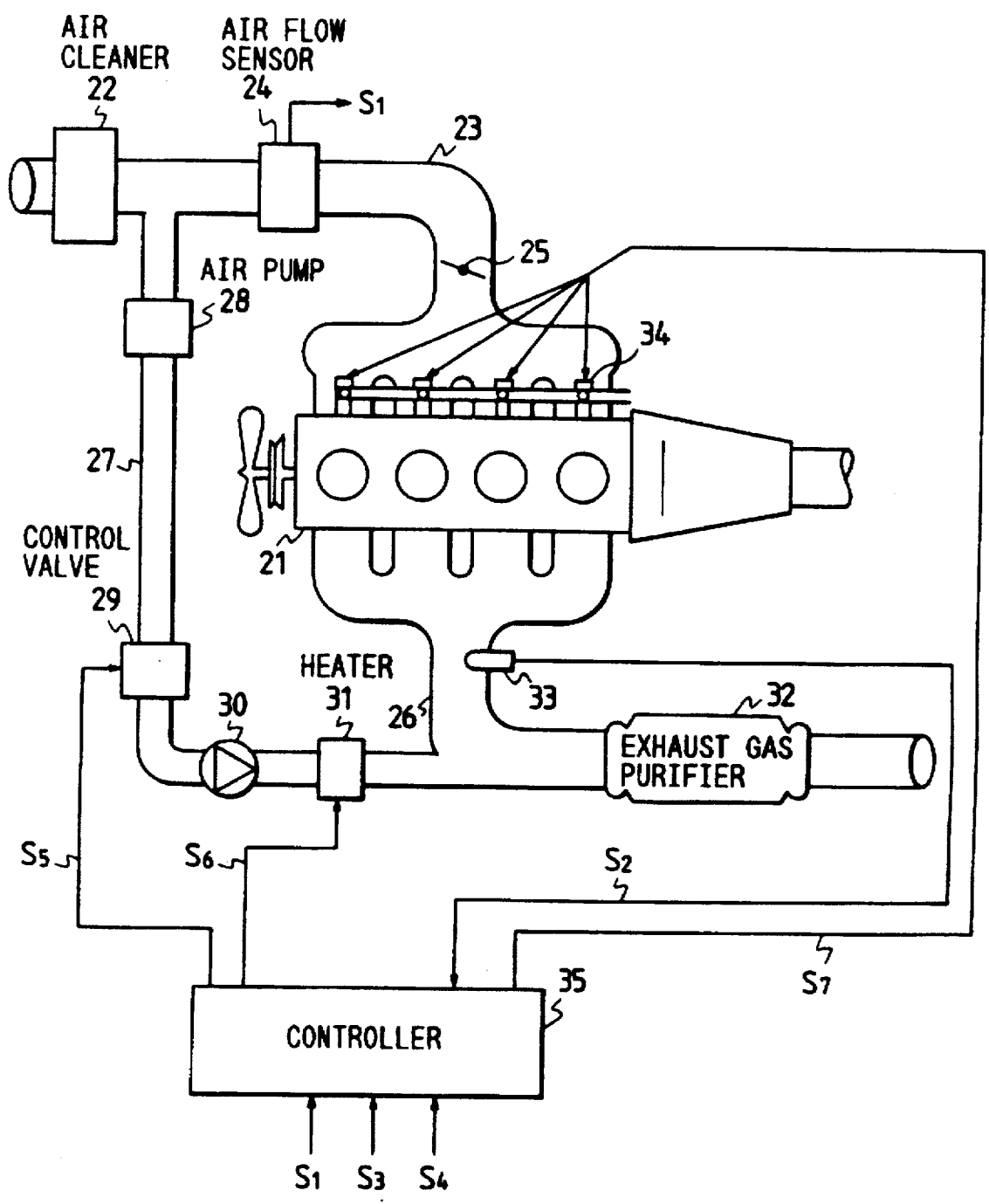
FIG. 1 is a configuration diagram illustrating an embodiment of the invention.

In FIG. 1, the reference numeral 21 represents an engine; 22, an air cleaner for eliminating dust in the atmosphere; 23, a suction pipe for feeding air cleaned by the air cleaner 22 into the engine 21; 24, an air flow sensor provided on the way of the suction pipe 23 to detect the quantity of air fed to the engine 21; 25, a throttle valve for adjusting the quantity of air fed to the engine 21; and 26, an exhaust pipe for exhausting harmful gas discharged from the engine 21.

The reference numeral 27 represents a secondary air feed pipe for extracting a portion of air cleaned by the air cleaner 22 as secondary air, and 28 represents an air pump for delivering the secondary air to the exhaust pipe 26. Open air may be led in directly without passing through the air cleaner 22. The reference numeral 29 represents a control valve for adjusting the feed quantity of secondary air, 30 represents a check valve for preventing exhaust gas flowing in the exhaust pipe 26 from entering the secondary air feed pipe 27, and 31 represents a heater acting as a secondary air heating means for heating secondary air to be fed to the exhaust pipe 26.

The reference numeral 32 represents an exhaust gas purifier provided on the way of the exhaust pipe 26 and using a catalyst. The exhaust gas purifier 32 oxidizes harmful components in exhaust gas by chemical reactions while receiving secondary air, thereby purifying the exhaust gas. The reference numeral 33 represents an $O_2$ sensor acting as a detection means which can detect the density of oxygen contained in exhaust gas of the engine 21 and obtain the air-fuel ratio of the engine 21, such as a zirconia $O_2$ sensor using a zirconia element, or a titania $O_2$ sensor using a titania element.

The reference numeral 34 represents an injector for injecting fuel from a fuel pump (not shown) toward an air intake valve in the engine 21. The reference numeral 35 represents a controller acting as an operation control device which calculates the feed quantity of secondary air on the basis of detection signals $S_1$ and $S_2$ of the respective sensors 24 and 33, an engine rotational speed detection signal $S_3$, a cooling water temperature detection signal $S_4$, and so on, and generates a control signal $S_5$ in accordance with the calculation to control the control valve 29. In addition, the controller 35 judges the necessity of heating secondary air on the basis of the operation conditions of the exhaust gas purifier 32 inferred from the operation conditions of the engine 21, and outputs a control signal $S_6$ for controlling ON/OFF of the heater 31. Further, the controller 35 obtains basic fuel injection pulse width from the above-mentioned detection signals $S_1$ and $S_3$, performs correction of temperature such as water temperature and so on, further performs air-fuel ratio feedback correction on the basis of the above-mentioned detection signals $S_1$ and $S_2$ so that the air-fuel ratio is equal to a theoretical air-fuel ratio, decides the injection pulse width, and generates a driving signal $S_7$ for driving the injector 34 to perform fuel control.

Next the operation will be described.

Figure 2:
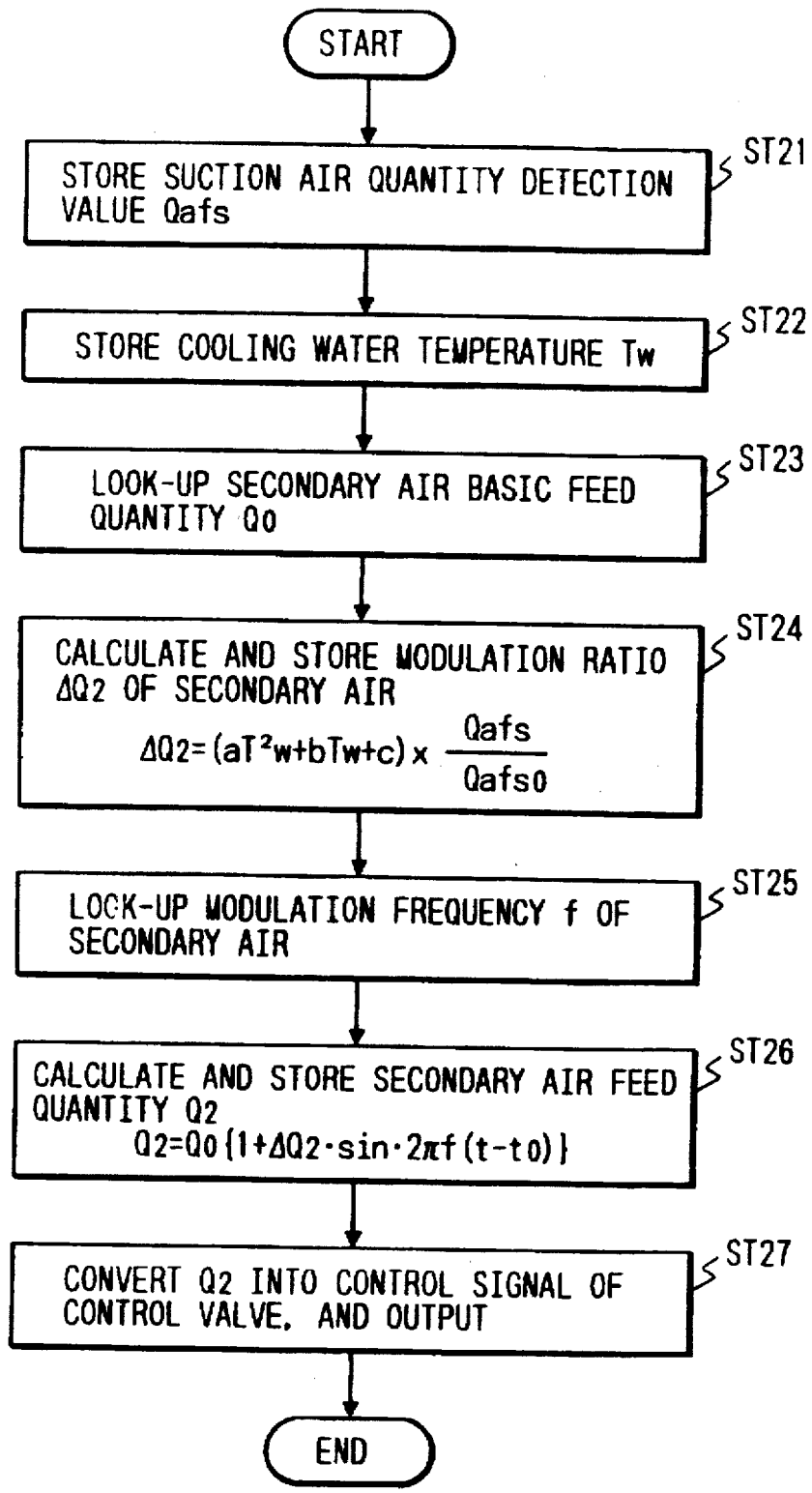
FIG. 2 is a flow chart illustrating operation of the embodiment.
Figure 3:
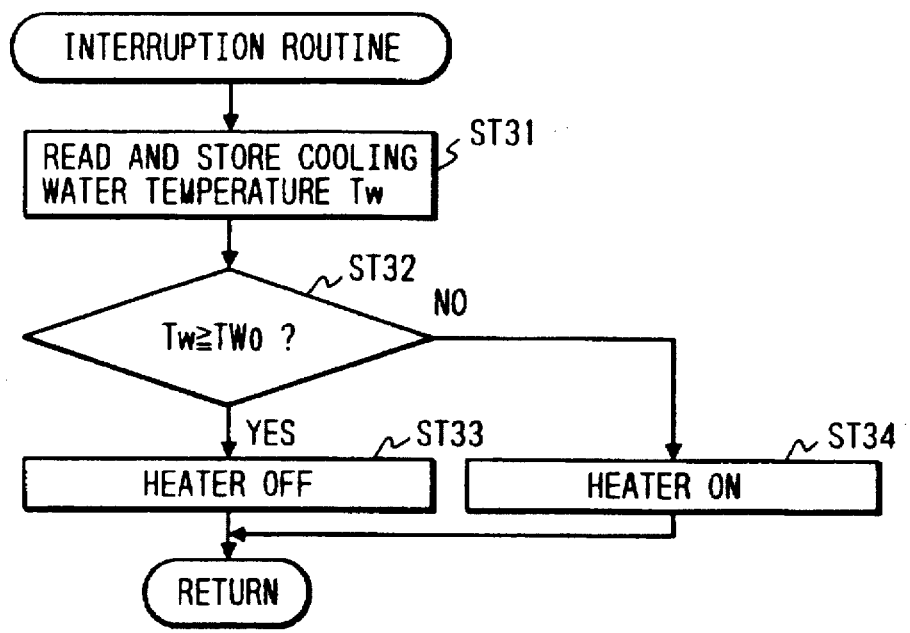
FIG. 3 is a flow chart illustrating operation of the embodiment.

The operation procedure of the controller will be described with reference to the flow charts in FIGS. 2 and 3. FIG. 2 shows a main routine of the processing for calculating and deciding the feed quantity of secondary air, and FIG. 3 shows an interruption routine generated every predetermined time, which is a routine of the processing for heating and controlling secondary air.

First, the operation of the routine of the processing for calculating and determining the feed quantity of secondary air will be described with reference to the flow chart in FIG. 2. Although the case of an engine including multi-point fuel injector and mounted with a suction air quantity detection sensor (air flow sensor 24) will be described as an example herein, not to say, the same operation will be performed in the case of an engine in which the air flow sensor 24 is replaced by a suction pipe pressure sensor or a cylinder pressure sensor.

In the drawing, a suction air quantity detection value Qafs calculated from a detection signal $S_1$ of the air flow sensor 24 in advance is read and stored in the RAM in Step ST21. In Step ST22, a detection signal $S_4$ of a cooling water temperature sensor (not shown) mounted on an engine body is read and stored as Tw in the RAM. Next, going to Step ST23, a secondary air basic feed quantity $Q_0$ is looked up on table in a predetermined two-dimensional map on the basis of the above-mentioned suction air quantity Qafs and cooling water temperature Tw stored in the RAM. Next, in Step ST24, a ratio $\Delta Q_2$ by which a control signal $S_5$ is modulated to the secondary air basic feed quantity $Q_0$ as 100% is calculated on the basis of the following expression, and stored.

$$\Delta Q_2 = (aTw^2 + bTw + c) \times (Qafs)/(Qafs_0) \quad (1)$$

where a, b and c are predetermined constants, and $Qafs_0$ is a known suction air quantity at the central point of the operation of the engine.

Figure 4:
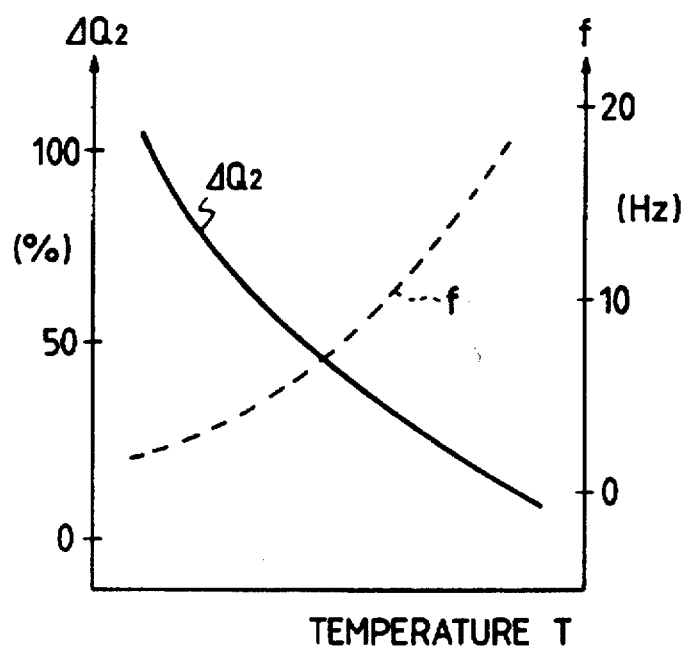
FIG. 4 is a graph illustrating the relationships among the temperature of cooling water, the rate of modulation, and the frequency.
Figure 5A:
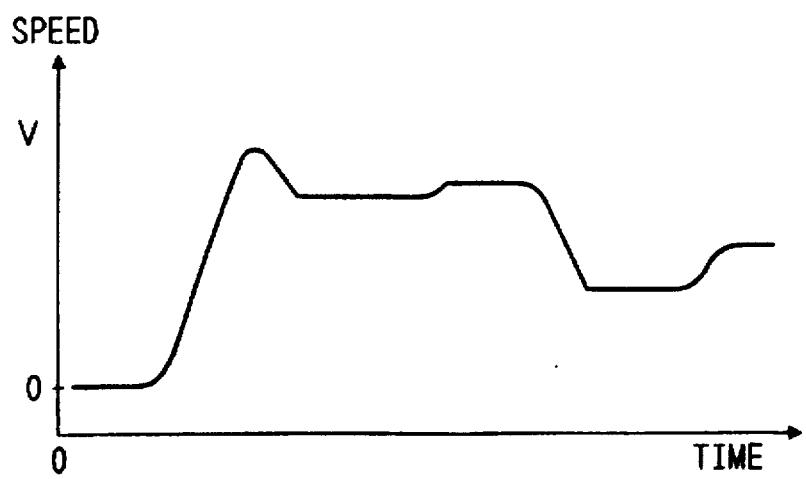
FIGS. 5A to 5D are graphs illustrating an example of operation.
Figure 5B:
Figure 5C:
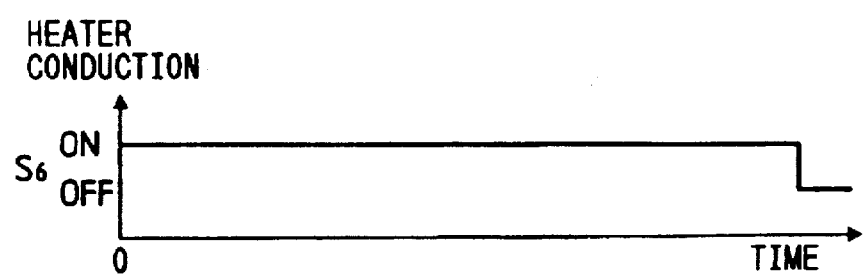
Figure 5D:
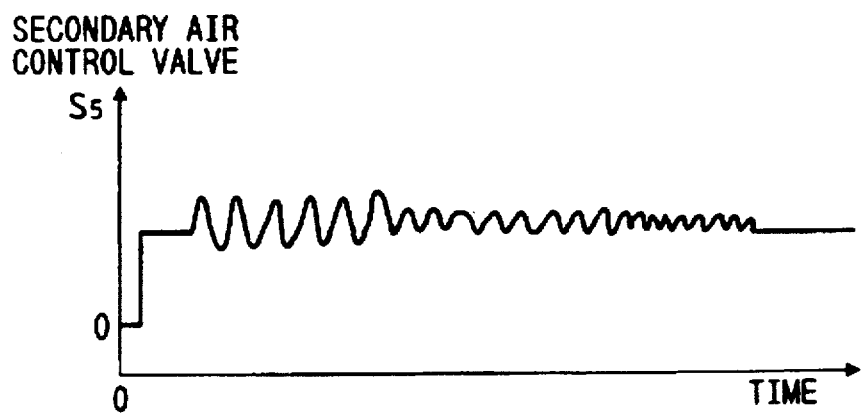

Next, going to Step ST25, a basic frequency f of the above-mentioned modulation is looked up on table on the basis of the cooling water temperature. The modulation rate $\Delta Q_2$ and the frequency f with respect to the secondary air basic feed quantity are decided experimentally in advance with respect to the cooling water temperature Tw, for example, with the relationship as shown in FIG. 4. As the temperature rises, the activity of a catalyst is advanced, and purifying reactions in the catalyst respond to smaller modulation width and higher modulation frequency.

On the basis of the results of the above Steps ST24 and ST25, the secondary air basic feed quantity $Q_0$ obtained in Step ST23 is corrected by the operation in accordance with the following expression, and a secondary air feed quantity $Q_2$ is obtained and stored in Step ST26.

$$Q_2 = Q_0 \times \{1 + \Delta Q_2 \cdot \sin 2\pi f(t - t_0)\} \quad (2)$$

where $t_0$ represents the initial time when the present correction control of secondary air is started.

In Step ST27, the secondary air feed quantity $Q_2$ obtained in Step ST26 is converted into a control signal $S_5$ of the secondary air control valve 29, and this control signal $S_5$ is supplied to the control valve 29. Then, the routine is ended. Although the secondary air modulation is based on a sine function in this embodiment, not to say, a rectangular or triangular wave function may be used.

As has been described above, by modulating the control signal $S_5$, it is possible to give variation of high and low to the density of oxygen in the case where purifying reactions of, for example, carbon monoxide is being advanced on a ternary catalyst, and consequently in comparison with the case of flowing in oxygen of a constant density, it is possible to increase the quantity of absorption of the catalyst effectively, and increase the quantity of reactions. This means an effective use of a harmonious absorption effect of CO and $O_2$ on the surface of the catalyst.

Next, the operation of heating control of secondary air led into the exhaust pipe 26 will be described with reference to the flow chart in FIG. 3.

In Step ST31, the cooling water temperature (detection signal $S_4$) is read and stored in the RAM. Since this cooling water temperature corresponds to the temperature condition of the catalyst heated by engine exhaust gas and so on, it is judged whether the cooling water temperature Tw is equal to or more than a predetermined value $Tw_0$ or not in Step ST32. If Yes here, it is concluded that the catalyst approaches its active state, and the reactions on the catalyst can be accelerated only by feeding secondary air of normal temperature and feeding oxygen to the catalyst, so that current supply to the heater 31 for heating air is made OFF by a control signal $S_6$ in Step ST33.

On the other hand, if No in Step ST32, it is concluded that the catalyst is not active, so that current supply to the heater 31 is made ON in Step ST34, and this interruption routine is ended. Although controlling is performed in accordance with the detection temperature of the water temperature sensor in the above description, a catalyst temperature sensor may be provided in the exhaust gas purifier 32 to perform control in accordance with the detection temperature of the catalyst temperature sensor.

The above-mentioned secondary air control operation shown in FIGS. 2 and 3 is stored in an ROM in the controller 35 in advance, and the feed quantity of secondary air, the feed pattern and the heater 31 are controlled into a predetermined relationship in accordance with the active state of the catalyst, so that it is possible to accelerate the activity of the catalyst at the time of low temperature to thereby reduce the quantity of harmful gas components discharged from the downstream of the catalyst.

FIG. 5 shows the relationships among the vehicle velocity V, the cooling water temperature Tw, a secondary air control signal $S_5$, and a control signal $S_6$ for supplying a current to the heater, relative to the passage of time. The warm-up state of an engine is advanced as the vehicle velocity V is increased, so that the cooling water temperature is raised. At this time, the secondary air control valve 29 is driven in consideration of the quantity of engine suction air and the temperature of cooling water, and the modulation amplitude relative to a secondary air control signal $S_5$ is controlled correspondingly to the temperature rising of the cooling water. Current supply to the heater 31 is made ON if the above-mentioned heater control processing routine is operated after starting the engine 21, and current supply to the heater 31 is made OFF if the cooling water temperature reaches a predetermined value.

Embodiment 2

Next, a second embodiment of the invention will be described.

While the case in which one oxygen density sensor ($O_2$ sensor 33) is provided on the entrance side of the exhaust gas purifier 32 was described in the above Embodiment 1, two $O_2$ sensors 33 are provided in the exhaust pipe 26 on the entrance and exit sides of the exhaust gas purifier 32 in FIG. 1 in this Embodiment 2, and the other configuration is quite the same as that in FIG. 1.

FIG. 6 is a flow chart illustrating the operation of the Embodiment 2

Since the operation about secondary air feeding and a manner of modulation thereof is the same as that shown in FIG. 2, so that its description will be omitted. The basic concept of this embodiment is that the variation of the output ratio between the $O_2$ sensors 33 disposed before and after the exhaust gas purifier 32 corresponding to the active state of a catalyst is used to control the heater 31 and the modulation of secondary air in accordance with the output ratio.

First, in Step ST61, the output of the $O_2$ sensor 33 on the entrance side of the exhaust gas purifier 32 is A/D-converted, read and stored as $x_f$ in the RAM. In the same manner, in Step ST62, the output of the $O_2$ sensor 33 on the exit side of the exhaust gas purifier 32 is read and stored as $x_r$. In Step ST63, the output ratio $x_r/x_f$ between the two $O_2$ sensors is calculated as a value SNj averaged by use of a one-dimensional filter as shown in the following expression.

$$SNj=(1-k)SN_{j-1}+k(x_r/x_f) \quad (3)$$

where k is a constant which corresponds to the cut-off frequency of the averaging filter, and k=0.2 in this case. This expression (3) can be obtained by converting a transfer function of time lag of first order into one for digital calculation, which has been generally used. For example, assume k is 0.5, and the expression (3) shows an average value of previous data and present data (running average). That is, k means the weight to data. The larger the value of k is, the larger the weight of present data, and the higher the cut-off frequency. On the contrary, the smaller the value of k is, the lower the cut-off frequency.

Next, in Step ST64, it is judged whether the output ratio average value SNj of the $O_2$ sensors 33 calculated in Step ST63 is equal to or less than a predetermined value $SN_0$ or not. If Yes, it is concluded that the catalyst is coming to its active state so that the density of oxygen in the downstream of the catalyst is made so uniform by reactions on the catalyst that the value SNj is small, and the heater 31 is made OFF in Step ST65. If No in Step ST64, it is concluded that the catalyst is not active, current supply to the heater 31 is kept on in Step ST66, and this interruption routine is ended.

Figure 7:
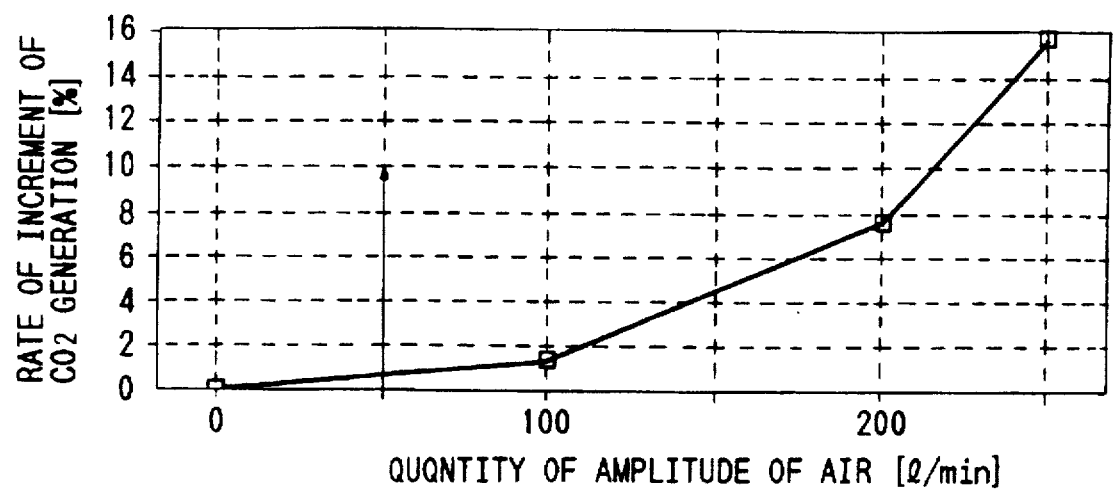
FIG. 7 is a graph illustrating the relationship between the quantity of variation of flow-in air and the rate of increase of generated CO$_2$.
Figure 8:
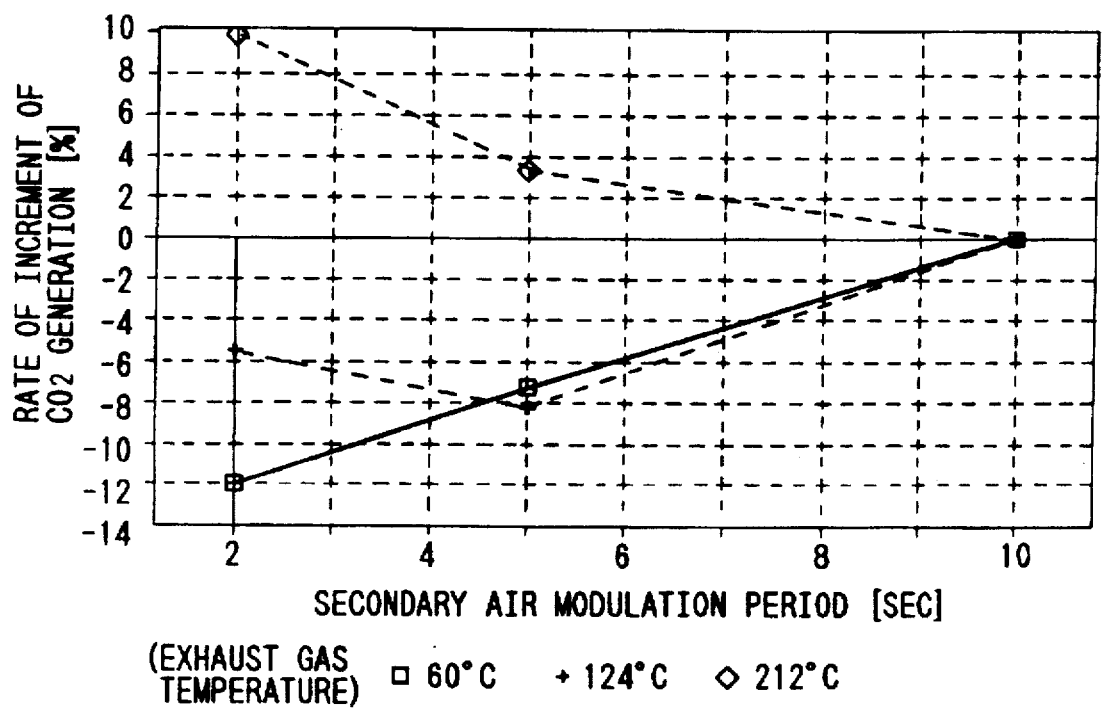
FIG. 8 is a graph illustrating the relationship between the period of flow-in of secondary air and the quantity of generated CO$_2$.

FIGS. 7 and 8 show the results of experiments. FIG. 7 shows the comparison of purifying effects in the cases of changing the quantity of air amplitude. The abscissa shows the quantity of amplitude, and the ordinate shows the rate of increment of $CO_2$ generation. The degree of catalyst reactions is herein obtained from $CO_2$ generated by the reactions, and the quantity of $CO_2$ generation at the time of feeding no secondary air at all is used as a reference. The period of feeding air is 10 seconds, and the temperature of exhaust gas is 60 degrees.

FIG. 8 shows the quantity of $CO_2$ generation on changing the amplitude frequency. This diagram shows it is necessary to change the frequency in response to the difference of the temperature of exhaust gas.

Embodiment 3

Next, an embodiment of the invention stated in Claim 4 will be described with reference to FIG. 9.

Figure 9:
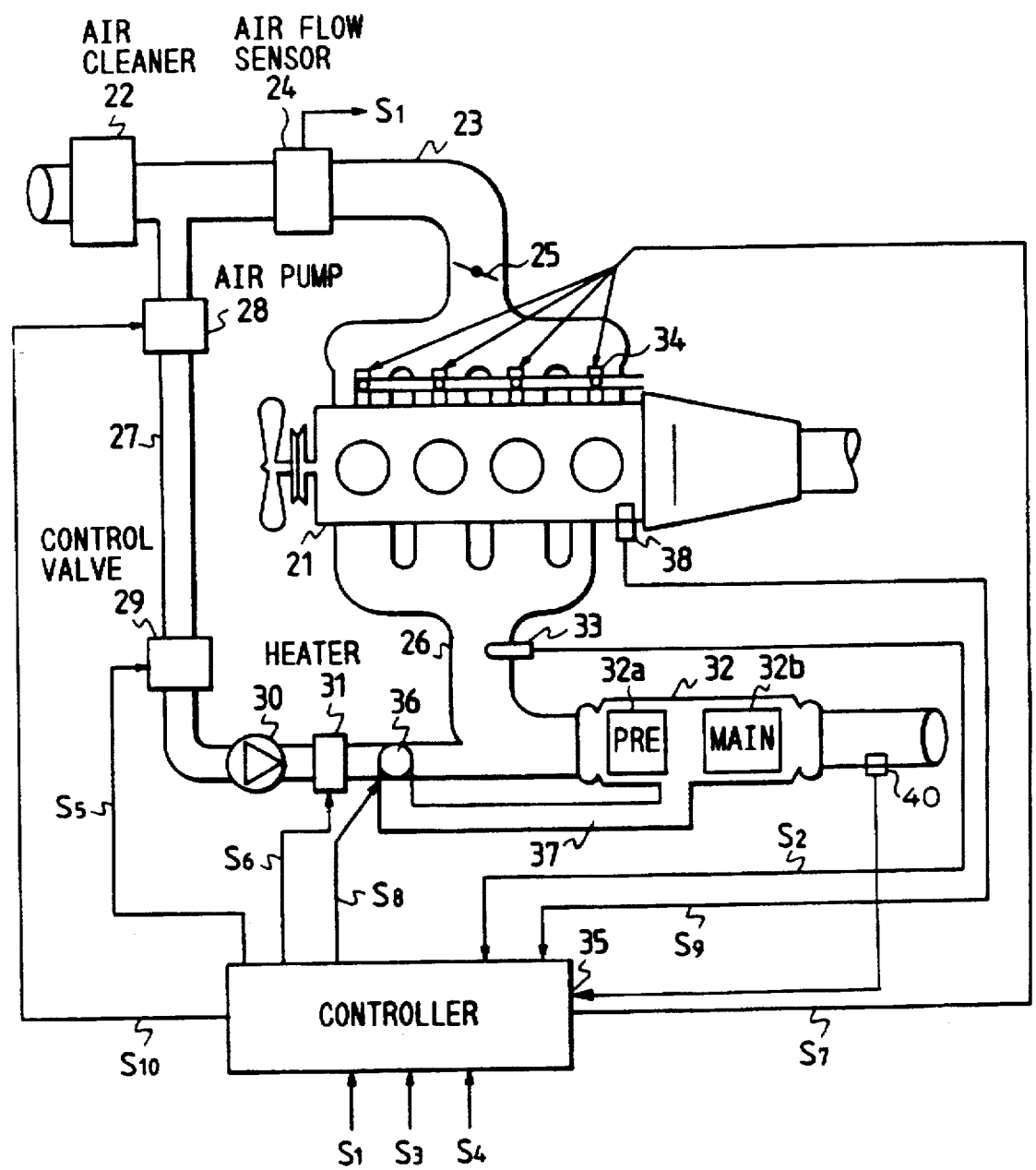
FIG. 9 is a configuration diagram illustrating an embodiment of the invention.

In this Embodiment 3, as shown in FIG. 9, a first catalyst (pre-catalyst) 32a acting as a first exhaust gas purifying means and a second catalyst (main catalyst) 32b acting as a second exhaust gas purifying means are provided in series close to each other within an exhaust gas purifier 32. In addition, a flow switching valve 36 is provided on the downstream side of a heater 31, and a pipe 37 for feeding secondary air to the second catalyst 32b is connected therefrom.

The flow switching valve 36 performs operations in response to a control signal $S_8$ from a controller 35, such as feeding secondary air to the upstream sides of the first and second catalysts 32a and 32b, or feeding secondary air only to the upstream side of the second catalyst 32b through the secondary air feed pipe 37. In addition, a cooling water temperature sensor 38 is provided in a cooling water passageway of an engine 21, for giving a detection signal $S_9$ of cooling water temperature to the controller 35. A secondary air switching device is constituted by the flow switching valve 36 and the secondary air feed pipe 37. In addition, a detection device for detecting the operation conditions of the engine is constituted by the cooling water temperature sensor 38 and an engine rotational speed detection means such as a crank angle sensor or the like.

Next, the operation will be described.

Figure 10:
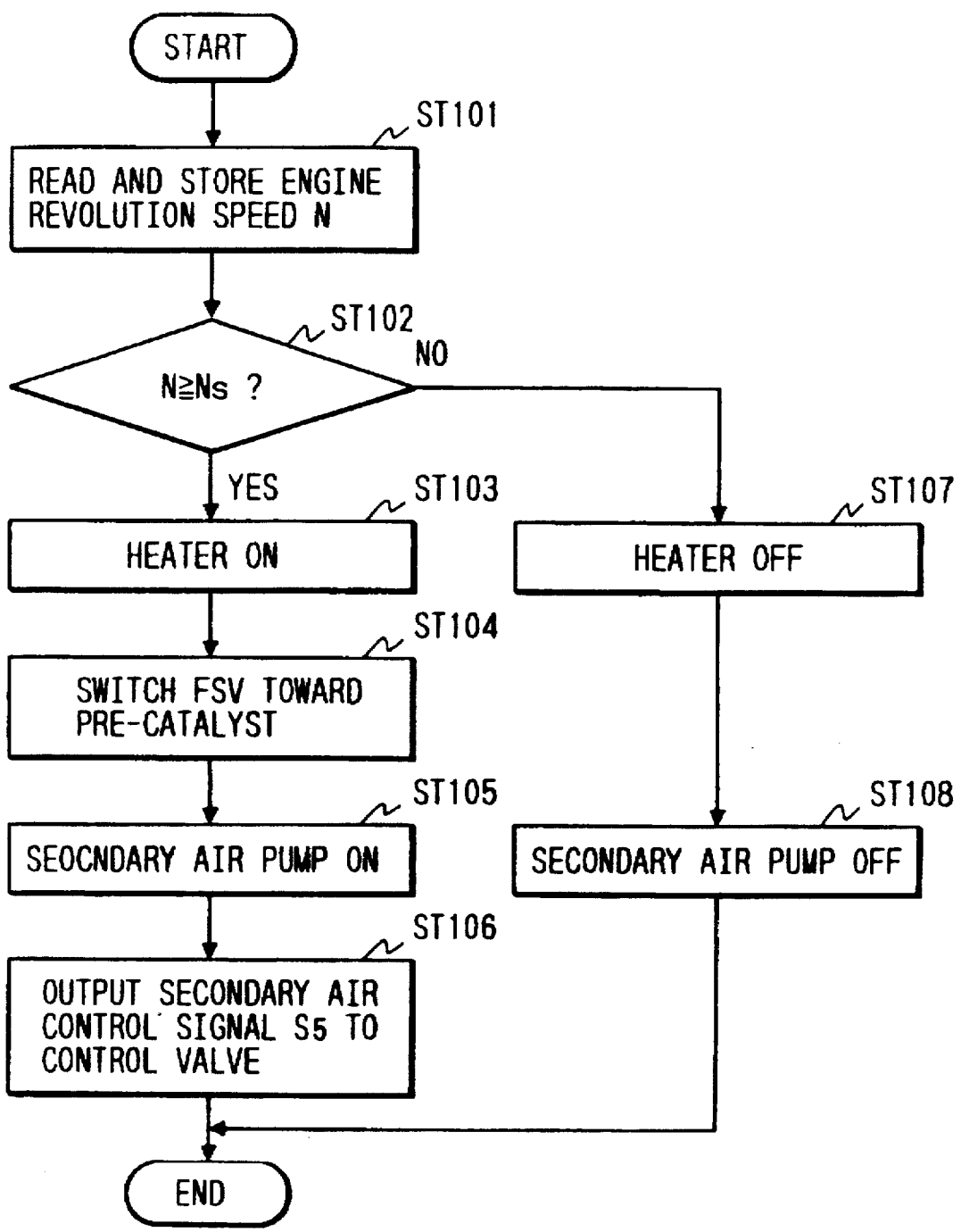
FIG. 10 is a flow chart illustrating operation of the embodiment.
Figure 11:
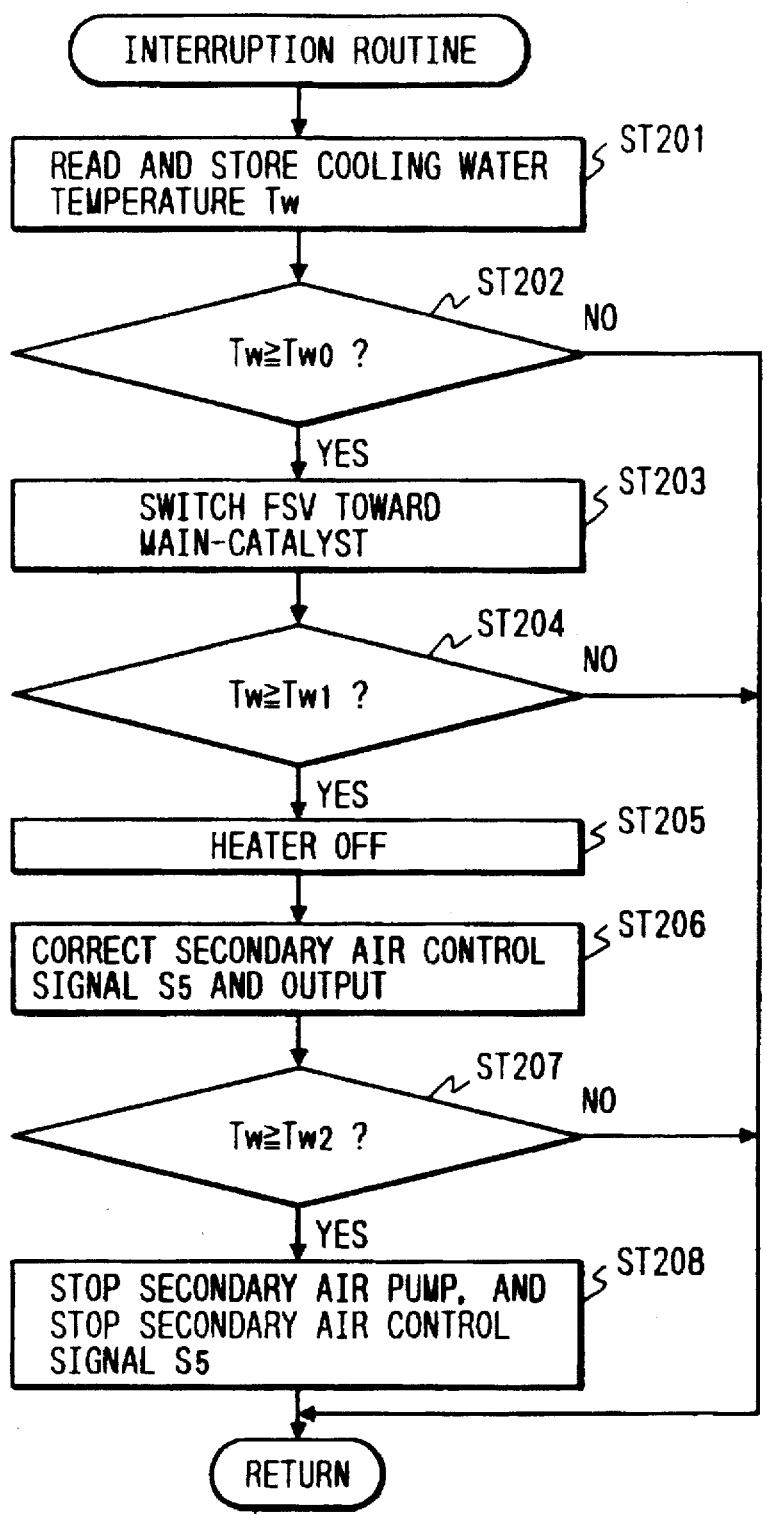
FIG. 11 is a flow chart illustrating operation of the embodiment.

The procedure of arithmetic operations in the controller 35 will be described along the flow charts in FIGS. 10 and 11. FIG. 10 shows a main routine of the processing for deciding to start feeding heated secondary air, and FIG. 11 shows an interruption routine generated every predetermined time, which is a routine of the processing for feeding and controlling heated secondary air in the case of using the temperature of cooling water as a detection value of engine operation conditions.

First, the operation of the routine of the processing for deciding to start feeding heated secondary air will be described with reference to the flow chart in FIG. 10. The case of using the engine rotational speed as engine operation conditions will be described herein as an example.

In Step ST101, the engine revolution speed N is read from an output signal of a crank angle sensor not shown in FIG. 9, and stored in an RAM. In Step ST102, it is judged whether the above-mentioned engine revolution speed N is equal to or more than a predetermined value Ns or not. As this predetermined value Ns, for example, N=500 rpm is used, by which it can be concluded that the engine 21 has finished starting and perfectly exploring, and has been warmed up. If Yes in Step ST102, going to Step ST103, current supply to the heater 31 for heating air is carried out in order to raise the temperature of secondary air to be fed to the catalyst to about 200° C.

Next, going to Step ST104, a control signal $S_8$ is outputted to drive the flow switching valve (FSV) 36 so that the exit of the secondary air feed passageway is switched to the direction of the entrance of the first catalyst (pre-catalyst) 32a. In Step ST105, a control signal $S_{10}$ is outputted to make an air pump 28 ON so that the secondary air heated in advance in Step ST103 is fed to the entrance of the first catalyst 32a. In Step ST106, a control signal $S_5$ is outputted to control a control valve 29 of the feed quantity of secondary air on the basis of predetermined modulation frequency and amplitude of the feed quantity of secondary air. For example, by use of a duty solenoid valve as the control valve 29, full open and full close are repeated with a predetermined frequency $f_0$=0.5 to 5 Hz, and secondary air modulated to a rectangular wave is supplied between air flow quantities 0 l/min and 100 to 150 l/min.

On the other hand, if N<Ns in Step ST102 so that it is concluded to be No, current supply to the heater 31 is stopped in Step ST107, and a control signal $S_{10}$ is outputted to make the air pump 28 OFF in Step ST108, thereby ending the processing of this routine.

Next, the operation of detecting the conditions of engine operation (cooling water temperature in this embodiment), and controlling the secondary air feed passageway, the heater 31 and the air pump 28 on the basis of the detection value will be described with reference to the flow chart in FIG. 11.

In Step ST201, the output of the cooling water temperature sensor 38 mounted on the engine body to detect the warm-up state of the engine is read and stored in the RAM. In Step ST202, it is judged whether cooling water temperature Tw is equal to or more than a predetermined value $Tw_0$ or not. If Yes, it is concluded that the temperature of the pre-catalyst is increased partially, and, going to Step ST203, the flow switching valve (FSV) 36 is switched from the first catalyst (pre-catalyst) 32a so that secondary air flows to the entrance direction of the second catalyst (main catalyst) 32b. This is because this processing is intended to prevent $NO_x$ from being generated in the pre-catalyst under the condition of excessive oxygen after activating the pre-catalyst in the configuration of this embodiment having the first and second catalysts 32a and 32b, in which the pre-catalyst is raised in temperature and activated sooner because of leading-in heated secondary air, so that the secondary air flow passage is switched to lead excessive oxygen only to the entrance of the main catalyst which is not yet raised in temperature and is not active to thereby perform purifying $NO_x$ in the pre-catalyst and accelerate purifying HC and CO in the main catalyst.

Next, in Step ST204, it is judged whether the cooling water temperature Tw is equal to or more than a second predetermined value $Tw_1$ or not. If Yes, going to Step ST205, it is concluded that warming up the engine is advanced to raise the temperature of exhaust gas and the catalysts themselves enough to make heating secondary air unnecessary, so that current supply to the heater 31 is made OFF. Further going to Step ST206, the driving frequency of the control signal $S_5$ for driving the control valve 29 with the predetermined basic frequency $f_0$ carried out in Step ST106 in FIG. 10 is corrected on the basis of the following expression, and the control signal $S_5$ of corrected frequency f is outputted.

$$f=f_0\times(a\times Tw+b) \qquad (4)$$

The above a and b are constants which are set in advance to correct the valve driving basic frequency $f_0$ into higher frequency 10 to 50 Hz.

As a result, the variation of the quantity of flow of air does not follow the driving period of the valve 13, and the quantity of flow of air constant to the driving frequency f is fed to the catalysts.

On the other hand, if No in Step ST202 or ST204, it is concluded that it is unnecessary to change the control quantity by heating and modulating secondary air, and then this interruption routine is ended.

Next, in Step ST207, in order to judge whether warming up the engine has been finished, and the temperature of the main catalyst is raised enough to be activated so that feeding secondary air is unnecessary or not, it is judged whether the cooling water temperature Tw is equal to or higher than a predetermined value $Tw_2$ or not. If Yes, going to Step ST208, current supply to the air pump 28 is made OFF to normally close the control valve 29, and the control signals $S_5$ and $S_{10}$ are outputted. On the other hand, if No in Step ST207, it is concluded that it is necessary to continue to feed secondary air, so that this interruption routine is ended while the air pump is kept ON.

In the above-mentioned judgments in Steps ST202, ST204 and ST207, the first, second and third predetermined cooling water temperatures decided experimentally in advance are, for example, $Tw_0$=35° C., $Tw_1$=50° C., and $Tw_2$=60° C. in the case of a car mounted with a 2-liter straight-4-cylinder engine. Since the relationship between the temperature of cooling water and the temperature rising of a catalyst is changed by cooling loss and so on depending on the operation conditions of the car as a whole, so that the above-mentioned temperatures $Tw_0$, $Tw_1$ and $Tw_2$ are decided experimentally.

As has been described, as a method of detecting the operation conditions of an engine, the rotational speed of the engine and the temperature of cooling water are detected, and secondary air heated in accordance with the respective conditions of increasing temperature of pre-catalyst (first catalyst 32a) and main catalyst (second catalyst 32b) provided close to each other is led into the entrances of the respective catalysts on the basis of the detection values thereof, so that the temperature rising of the pre-catalyst is accelerated by oxidization reactions at an early time after starting the engine, and in addition thereto the reaction heat generated in the pre-catalyst is fed to the main catalyst. The engine is warmed up so that exhaust gas of the engine is coming to the state showing a theoretical air-fuel ratio, and secondary air is controlled to be led into the main catalyst being inactive and lacking in oxygen for purifying HC and CO, so that the air-fuel ratio at the entrance of the pre-catalyst can be prevented from being so lean as to generate $NO_x$ by leading secondary air therein. Accordingly, it is possible to reduce the quantity of exhaust HC and CO on a scale not less than conventional one and with lower quantity of exhaust $NO_x$ than conventional one.

Embodiment 4

Although a cooling water temperature sensor is used as an engine operation condition detection means in Embodiment 3 in order to switch the FSV, make the secondary air heating heater 31 ON/OFF, and control the feed quantity of secondary air, an exhaust gas temperature sensor 40 may be provided on the downstream of the second catalyst 32b in the configuration of the embodiment shown in FIG. 9, in order to use this exhaust gas temperature sensor as a catalyst purification detection means.

Figure 12:
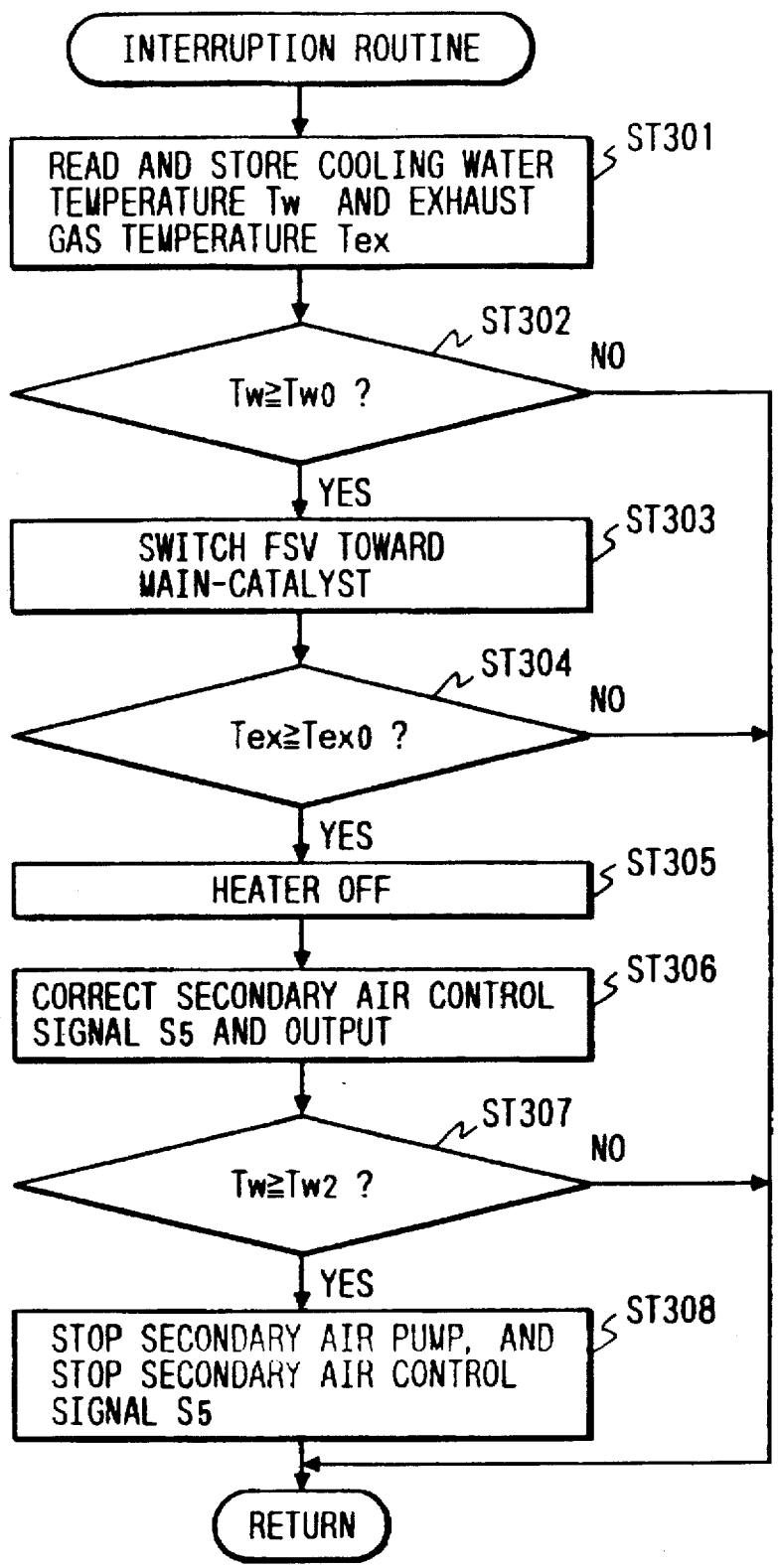
FIG. 12 is a flow chart illustrating the operation of the Embodiment.
Figure 13:
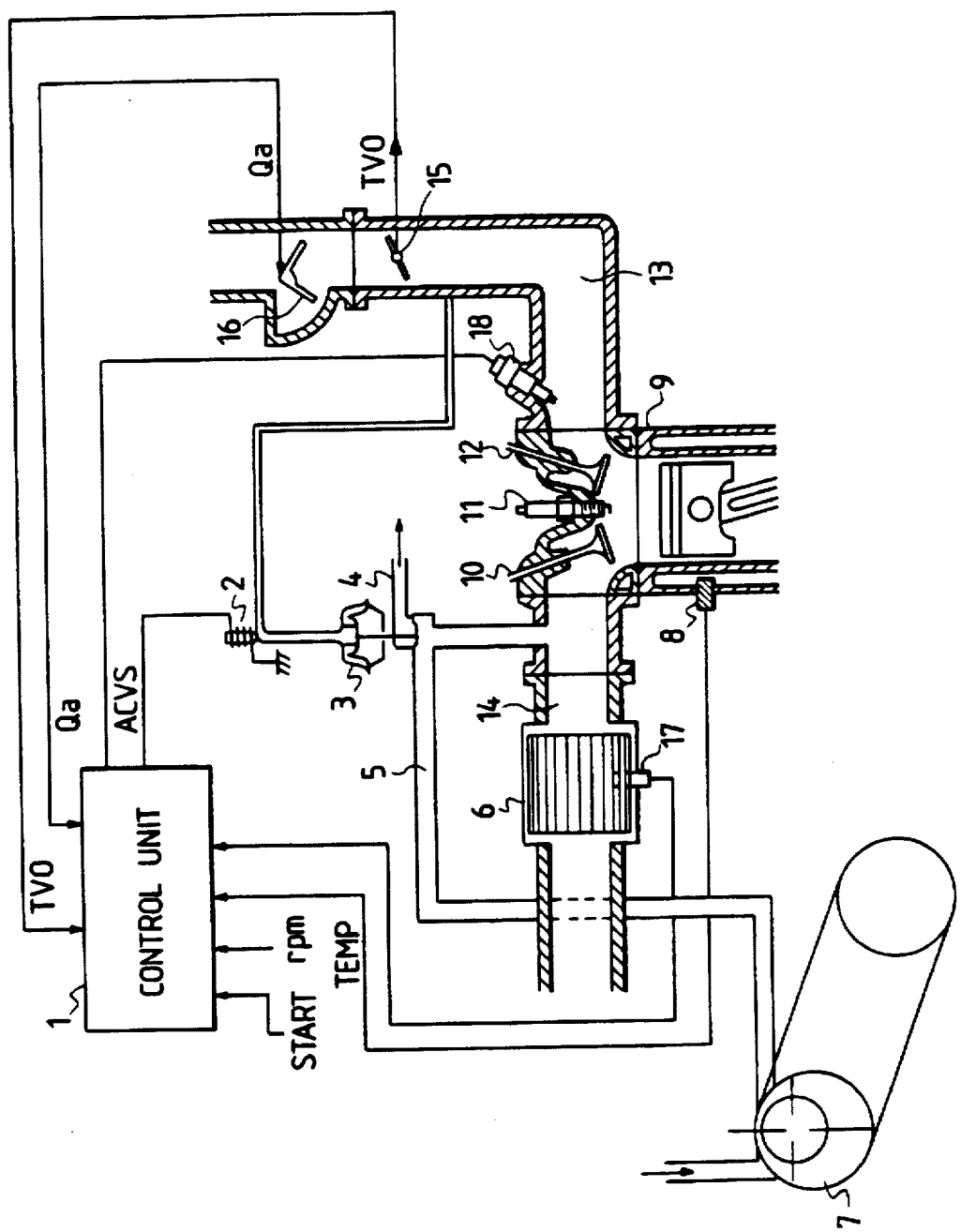
FIG. 13 is a configuration diagram of a conventional secondary air control apparatus.
Figure 14:
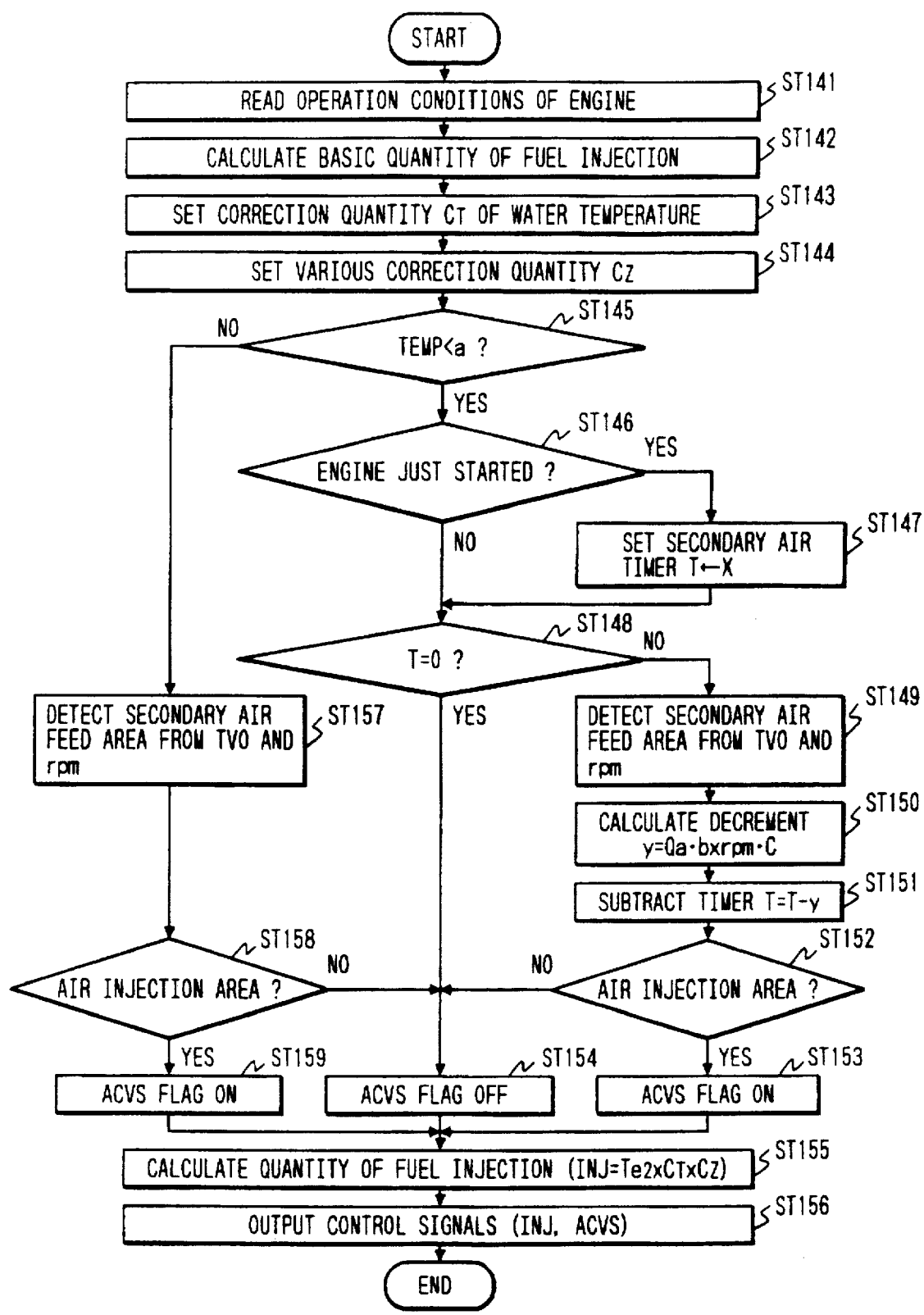
FIG. 14 is a flow chart illustrating operation of the conventional secondary air control apparatus.

In this case, as shown in the flow chart in FIG. 12, the operation in Steps ST302 to ST303 and ST305 to ST308 may be the same as that in Steps ST202 to ST203 and ST205 to ST208 in the flow chart in FIG. 11, changed only in Steps ST301 and ST304 in which it is judged whether exhaust gas temperature Tex detected and stored in Step ST301 is larger than predetermined catalyst exit exhaust gas temperature $Tex_0$ or not, and current supply to the heater 31 and feeding secondary air are controlled thereby.

As has been described, according to the invention, a control valve for controlling the feed quantity of secondary air, and the amplitude and frequency of a control signal for controlling the above-mentioned control valve are operated on the basis of the quantity of suction air of an engine, the temperature of cooling water, and so on, so that there is an effect that temperature rising is accelerated so that an exhaust gas purifier can perform a purifying operation most efficiently in response to the operation conditions of the engine.

According to the invention, a secondary air heating device for heating secondary air is provided, and controlled correspondingly to the temperature of cooling water of an engine or the temperature of an exhaust gas purifier, so that there is an effect that it is possible to accelerate the purifying operation of the exhaust gas purifier even at the time of low temperature.

According to the invention, oxygen density detection device are provided on the entrance and exit sides of an exhaust gas purifier, and the above-mentioned secondary air heating means is controlled on the basis of the output ratio of the detection means, so that there is an effect that it is not only possible to accelerate the purifying operation of exhaust gas even at the time of low temperature, but it is also possible to control the secondary air heating means so efficiently as to restrain the power consumption to the minimum.

According to the invention, two exhaust gas purifying device are provided, and feeding secondary air thereto is controlled in accordance with the operation conditions of an engine, so that there is an effect that it is possible to reduce the quantity of exhaust HC and CO on a scale not less than conventional one and with lower quantity of exhaust $NO_x$ than conventional one.

What is claimed is:

1. A secondary air control apparatus for use in an exhaust gas purifier for purifying, with a catalyst, an exhaust gas of an engine fed with secondary air so that said secondary air control apparatus controls supply of said secondary air, said secondary air control apparatus comprising:

a control valve operated by a control signal to control a feed quantity of said secondary air; and operation control means for calculating an amplitude and frequency of said control signal based only on a quantity of suction air received by a suction intake pipe disposed upstream of the engine and a temperature of cooling water of said engine.

2. A secondary air control apparatus for use in an exhaust gas purifier for purifying, with a catalyst, an exhaust gas of an engine fed with secondary air so that said secondary air control apparatus controls supply of said secondary air, said secondary air control apparatus comprising:

secondary air heating means, disposed upstream from said catalyst, for heating only secondary air to be fed to said exhaust gas; and control means for controlling said secondary air heating means based on one of a temperature of cooling water of said engine and a temperature of said exhaust gas purifier.

3. A secondary air control apparatus for use in an exhaust gas purifier for purifying, with a catalyst, an exhaust gas of an engine fed with secondary air so that said secondary air control apparatus controls supply of said secondary air, said secondary air control apparatus comprising:

secondary air heating means for heating secondary air to be fed to said exhaust gas;

first detection means provided on an entrance side of said exhaust gas purifier for detecting density of oxygen in said exhaust gas;

second detection means provided on an exit side of said exhaust gas purifier for detecting the density of oxygen in said exhaust gas; and operation control means for performing a predetermined operation based on a ratio of detection outputs of said first and second detection means to output a control signal for controlling said secondary air heating means based on the result of said predetermined operation.

4. A secondary air control apparatus as claimed in claim 3, wherein said first and second detection means are one of a zirconia $O_2$ sensor using a zirconia element and a titania $O_2$ sensor using a titania element.

5. A secondary air control apparatus for use in an exhaust gas purifier for purifying, with a catalyst, an exhaust gas of an engine fed with secondary air so that said secondary air control apparatus controls supply of secondary air, said secondary air control apparatus comprising:

first and second exhaust gas purifying means provided in series within said exhaust gas purifier;

secondary air switching means for feeding secondary air selectively to only said second exhaust gas purifying means or both said first and second exhaust gas purifying means; and detection means for detecting the operation conditions of said engine to thereby control said secondary air switching means on the basis of the detection.

6. A secondary air control apparatus as claimed in claim 5, wherein said detection means comprises a cooling water temperature detection means and an engine rotational speed detection means.

7. A secondary air control apparatus for use in an exhaust gas purifier for purifying, with a catalyst, an exhaust gas of an engine fed with secondary air so that said secondary air control apparatus controls supply of secondary air, said secondary air control apparatus comprising:

first and second exhaust gas purifying means provided in series within said exhaust gas purifier;

secondary air switching means for feeding secondary air selectively to only said second exhaust gas purifying means or both said first and second exhaust gas purifying means; and exhaust gas temperature detecting means provided downstream of said second exhaust gas purifying means as a catalyst purification detection means, so that an exhaust gas temperature detected by said exhaust gas temperature detecting means is compared with a predetermined catalyst exit gas temperature to control said secondary air switching means.

* * * * *